Patented Oct. 7, 1930

1,777,338

UNITED STATES PATENT OFFICE

CHARLES A. THOMAS, OF OAKWOOD, AND CARROLL A. HOCHWALT, OF DAYTON, OHIO

PROCESS OF AND CHARGE FOR PRODUCING CARBON DIOXIDE AT LOW TEMPERATURES

No Drawing.   Application filed November 16, 1925. Serial No. 69,527.

This invention relates to a process of, and charge for, producing carbon dioxide at low temperatures.

It is the principal object of our invention to provide suitable non-freezing chemicals which will react with high efficiency at temperatures as low as −40° C., to produce a gas such as carbon dioxide for expelling a liquid such as carbon tetrachloride, water or any other fluid having fire extinguishing properties from a fire extinguisher.

It is a further object of our invention to accelerate the reaction of these chemicals by the presence of water.

With a view of meeting the A—1 rating of the Board of National Fire Underwriters, which requires that a fire extinguisher be capable not only of withstanding a temperature as low as −40° C., but of operating at high efficiency at that temperature, we have, by searching and sustained experiments, ascertained that certain compounds containing a sulphonic acid radical, such as a halogenated sulphonic acid, which will not freeze at extremely low temperatures, will react with any carbonate, either solid, insolution or in suspension, to produce carbon dioxide.

Such a halogenated sulphonic acid is chlorosulphonic acid, $ClSO_2OH$, fluorosulphonic acid, $FSO_2OH$, or, in fact, any sulphonic acid containing any element of the halogen group. Chlorosulphonic acid, which will not freeze at extremely low temperatures, is admirably adapted to act upon a solid carbonate, such as sodium bi-carbonate, $NAHCO_3$, to produce carbon dioxide with maximum efficiency at temperatures much lower than −40° C. This reaction may be accelerated by water to which any suitable non-freezing agent may be added.

It has been definitely ascertained that one molecule of chlorosulphonic acid acts with three molecules of sodium bicarbonate to produce three molecules of carbon dioxide, these agents resisting a temperature as low as −80° C.

An effective charge of these non-freezing agents for expelling a gallon and a half of liquid from a fire extinguisher, consists of 8 ounces of sodium bi-carbonate and 2½ fluid ounces of chlorosulphonic acid. The fire extinguishing liquid may be water to which any suitable freezing temperature depressant, such as calcium chloride, is added.

While we have found sodium bi-carbonate to be an effective carbonate for reacting with chlorosulphonic acid to produce carbon dioxide at extremely low temperatures, any other carbonate, either solid, in solution or in suspension, such as sodium carbonate, magnesium carbonate, potassium carbonate and ammonium carbonate may be used with a halogenated sulphonic acid for this purpose with highly satisfactory results.

We have also found that a sulphonic acid radical ($SO_2OHR$) such as the sulphonic acid of acetic acid, $CH_2SO_2OHCOOH$, benzene sulphonic acid, $C_6H_5SO_2OH$ or any other organic sulphonic acid, will react with any carbonate to produce carbon dioxide at extremely low temperatures.

We do not set forth any specific means for effecting the reaction of a sulphonic acid radical ($SO_2OHR$) with the carbonate employed, since any of the well known fire extinguishers providing means for admixing two normally isolated chemicals may be used. If this admixture takes place in the presence of water, the reaction will be accelerated.

Having described our invention, we claim:

1. The process of producing carbon dioxide at low temperatures, which comprises admixing an acid compound containing a sulphonic acid radical with a carbonate at a temperature of the order of −40° C.

2. The process of producing carbon dioxide at low temperatures, which comprises admixing a halogenated sulphonic acid with a carbonate at a temperature of the order of −40° C.

3. The process of producing carbon dioxide at low temperatures, which comprises admixing chlorosulphonic acid with a carbonate at a temperature of the order of −40° C.

4. The process of producing carbon dioxide of low temperatures, which comprises admixing chlorosulphonic acid with sodium bi-carbonate at a temperature of the order of −40° C.

5. The process of producing carbon dioxide at low temperatures which comprises admixing an acid compound containing a sulphonic acid radical with a carbonate in the presence of water at a temperature of the order of −40° C.

6. The process of producing carbon dioxide at low temperatures of the order of −40° C., which consists in admixing an acid compound containing a sulphonic acid radical with a carbonate in the presence of a solution of calcium chloride in water.

7. A non-freezing charge for fire extinguishers, comprising two normally separated portions, one of which consists of a compound containing a sulphonic acid radical and the other of a carbonate.

8. A non-freezing charge for fire extinguishers, comprising two normally separated portions, one of which consists of a halogenated sulphonic acid and the other of a carbonate.

9. A non-freezing charge for fire extinguishers, comprising two normally separated portions, one of which consists of chlorosulphonic acid and the other of a carbonate.

10. A non-freezing charge for fire extinguishers, comprising two normally separated portions, one of which consists of chlorosulphonic acid and the other of sodium bi-carbonate.

11. A non-freezing charge for fire extinguishers, comprising three normally separated portions, one of which consists of a compound containing a sulphonic acid radical, another of a carbonate and the third of water.

12. A charge for fire extinguishers, comprising as three normally separated portions, a compound containing a sulphonic acid radical, the second containing a carbonate, and the third water containing a freezing temperature depressant in solution therein.

13. A charge for fire extinguishers adapted for use at low temperatures, comprising as normally separated portions, a compound containing a sulphonic acid radical and a material adapted to re-act therewith to generate an expelling gas.

14. The process of producing carbon dioxide at low temperatures, which comprises admixing an acid compound containing a sulphonic acid radical with a carbonate at temperatures not exceeding approximately the freezing point of water.

15. The process of producing carbon dioxide at low temperatures, which comprises admixing chlorosulphonic acid with a carbonate at temperatures not exceeding approximately the freezing point of water.

In witness whereof we have hereunto set our hands this 12 day of November, 1925.

CHARLES A. THOMAS.
CARROLL A. HOCHWALT.

CERTIFICATE OF CORRECTION.

Patent No. 1,777,338.                                Granted October 7, 1930, to

CHARLES A. THOMAS ET AL.

It is hereby certified that error appears in the printed specification of the above numbered patent requiring correction as follows: Page 1, line 65, after the word "that" insert the words "other compounds containing"; line 68, before the word "or" insert a comma, and line 73, after "of" insert a compound containing; and that the said Letters Patent should be read with these corrections therein that the same may conform to the record of the case in the Patent Office.

Signed and sealed this 9th day of December, A. D. 1930.

(Seal)
                                                                         M. J. Moore,
                                              Acting Commissioner of Patents.